United States Patent [19]

Cohen et al.

[11] Patent Number: 5,348,690
[45] Date of Patent: Sep. 20, 1994

[54] PREPARATION OF CHEMILUMINESCENT VINYL HALIDE OR VINYLIDENE HALIDE POLYMER STRUCTURES

[75] Inventors: Martin L. Cohen, White Plains, N.Y.; William E. Bay, Ridgefield, Conn.; Lynn E. Errigo, Port Chester, N.Y.

[73] Assignee: Omniglow Corporation, Novato, Calif.

[21] Appl. No.: 944,572

[22] Filed: Sep. 14, 1992

Related U.S. Application Data

[62] Division of Ser. No. 632,844, Dec. 24, 1990, Pat. No. 5,173,218.

[51] Int. Cl.$^5$ ............... C09K 3/00; F21K 2/00
[52] U.S. Cl. ............... 252/700; 252/301.16; 362/34
[58] Field of Search ............ 252/582, 700, 301.16; 362/34

[56] References Cited

U.S. PATENT DOCUMENTS

| | | | |
|---|---|---|---|
| 3,350,553 | 10/1967 | Cline | 362/34 |
| 3,362,378 | 1/1968 | Bens | 362/34 |
| 3,539,794 | 11/1970 | Rauhut et al. | 252/700 |
| 3,729,425 | 4/1973 | Heller et al. | 252/700 |
| 3,774,022 | 11/1973 | Dubrow et al. | 252/700 |
| 3,808,414 | 4/1974 | Roberts | 252/700 |
| 3,816,325 | 6/1974 | Rauhut et al. | 252/700 |
| 3,893,938 | 7/1975 | Rauhut | 252/700 |
| 3,994,820 | 11/1976 | Maulding et al. | 252/700 |
| 4,635,166 | 1/1987 | Cameron | 362/34 |
| 4,814,949 | 3/1989 | Elliott | 362/34 |
| 4,859,369 | 8/1989 | Baretz et al. | 252/700 |
| 5,121,302 | 6/1992 | Bay et al. | 252/700 |
| 5,173,218 | 12/1992 | Cohen et al. | 252/700 |

Primary Examiner—Philip Tucker
Attorney, Agent, or Firm—Majestic, Parsons, Siebert & Hsue

[57] ABSTRACT

A plasticized vinyl halide or vinylidene halide polymer structure useful in a chemiluminescent lighting device is disclosed wherein said structure is prepared from vinyl halide or vinylidene halide polymers. The plasticizer is preferably a dibutyl phthalate solution of a chemiluminescent oxalate and a fluorescer that is incorporated into the structure. Addition of a hydrogen peroxide activator solution to the structure produces the glow of chemical light. The structure has good strength, flexibility, porosity and absorbance of the activator solution. A method for the preparation of the structure is also disclosed.

11 Claims, No Drawings

PREPARATION OF CHEMILUMINESCENT VINYL HALIDE OR VINYLIDENE HALIDE POLYMER STRUCTURES

This is a divisional of co-pending application, Ser. No. 07/632,844, filed Dec. 24, 1990, now U.S. Pat. No. 5,173,218.

BACKGROUND OF THE INVENTION

The production of devices capable of emitting light through chemical means in well known in the art. Chemiluminescent lightsticks, for example, are taught by U.S. Pat. No. 3,539,794. Other configurations of devices for emitting chemical light have also been the subject of many U.S. patents, see, for example U.S. Pat. Nos. 3,350,553; 3,729,425; 3,808,414; 3,893,938 and 4,814,949. A recent patent, U.S. Pat. No. 4,635,166 has also issued directed to an emergency light containing a reflector. The above-mentioned patents are hereby incorporated herein by reference.

The devices of the prior art, while satisfying some specific needs, have generally not received wide-spread commercial acceptance because they fail in one or more critical areas. The devices of U.S. Pat. No. 3,350,533, for example, must be activated by air which requires some means for accessing the air, which means are subject to failure such as by leaking etc. Other devices have failed commercially because of their inability to emit light over the required period of time, while others emit poor quantities of light, do not concentrate the light in a centralized area, require too much chemical to be commercially attractive from an economic standpoint, do not emit light over a uniform area, etc.

Accordingly, industry is continually on the lookout for chemiluminescent devices which overcome most, if not all, of the deficiencies mentioned above, which devices are commercially attractive to the consumer and are relatively simply manufactured.

Rauhut et. al. combined the oxalate and fluorescer components of a chemiluminescent reaction mixture with a single polyvinyl chloride resin and a plasticizer and formulated a polymer film composition. The film produced a bright yellow-green chemiluminescent light when placed in a solution of hydrogen peroxide and sodium salicylate as disclosed in U.S. Pat. No. 3,816,325, which is also incorporated herein by reference. While this invention is operative, the single resin polyvinyl chloride sheet has deficiencies in its uniformity, strength, flexibility, porosity, absorbance and light development. The present invention comprises an absorptive material that is made in a reproducible fashion and has good strength, flexibility porosity, absorbance and light development that is not known in the prior art.

SUMMARY OF THE INVENTION

There is disclosed herein a porous, flexible, structure comprising A) a non-particulate phase comprising a vinyl halide or vinylidene halide polymer having a molecular weight of about 100,000 to about 500,000 which constitutes about 0.5 to about 15.0 weight percent of total polymer, and B) an agglomerated particle phase comprising either 1) about 85.0 to about 99.5 weight percent of total polymer of vinyl halide or vinylidene halide polymer particles having a diameter of from about 25 to about 125 microns and a molecular weight of from about 50,000 to about 120,000, or mixtures of said particles, or 2) about 45 to about 98.5 weight percent of total polymer of vinyl halide or vinylidene halide polymer particles having a diameter of from about 25 to about 125 microns and a molecular weight of from about 50,000 to about 120,000, or mixtures of said particles and about 1 to about 40 weight percent of total polymer halide of vinyl halide or vinylidene polymer particles having a diameter of from about 130 to about 225 microns and a molecular weight of from about 100,000 to about 225,000. The plasticizer used comprises a solvent solution of a chemiluminescent compound and, optionally, a fluorescer, dispersed throughout both said phases.

The vinyl halide or vinylidene halide polymers useful in the production of the novel structures of the present invention are well known in the art. They include polyvinyl halides such as polyvinyl chloride and polyvinyl fluoride; polyvinylidene halides such as polyvinylidene chloride and polyvinylidene fluoride; copolymers of vinyl halides and/or vinylidene halides with hydrocarbons such as ethylene, propylene etc. in amounts of up to about 25%, by weight, based on the total weight of polymer preferably 5–15%, by weight, same basis; copolymers of vinyl halides such as vinyl chloride/vinyl fluoride copolymers; copolymers of vinylidene halides such as vinylidene chloride and vinylidene fluoride; copolymers of vinyl halides and vinylidene halides such as vinyl chloride and vinylidene chloride; terpolymers of vinyl halides and vinylidene halides such as terpolymers of vinyl chloride, vinyl fluoride and vinylidene chloride; mixtures of the above vinyl halide polymers and vinylidene halide polymers; mixtures of vinyl halide or vinylidene halide polymers and hydrocarbon polymers such as polyvinyl chloride and polyethylene in amounts up to about 25%, by weight, based on the total weight of polymers, of hydrocarbon polymer, preferably about 5–15%, be weight, same basis.

Homopolymers and copolymers of vinyl chloride are preferred.

Useful plasticizer solvents are selected from dialkyl esters of phthalic acid, ethylene glycol ethers, citric acid esters or alkyl benzoates such as ethyl benzoate, butyl benzoate etc. A preferred plasticizer solvent is dibutyl phthalate.

Useful chemiluminescent compounds are selected from 3-aminophthalhydrazide, 2,4,5-triphenylimidazole, 10,10'-dialkyl-9,9'-biacridinium salts 9-chlorocarbonyl-10-methylacridinium chloride, and bis(substituted-phenyl) oxalate is bis(2-nitrophenyl) oxalate, bis(2,4-dinitrophenyl) oxalates. Useful oxalates include those such bis(2,6-dichloro-4-nitrophenyl) oxalate, bis(2,4,6-trichlorophenyl) oxalate, bis(3-trifluoromethyl-4-nitrophenyl) oxalate, bis(2-methyl-4,6-dinitrophenyl) oxalate, bis(1,2-dimethyl-4,6-dinitrophenyl) oxalate, bis(2,4-dichlorophenyl) oxalate, bis(2,5-dinitrophenyl) oxalate, bis(2-formyl-4-nitrophenyl) oxalate, bis(pentachlorophenyl) oxalate, bis)1,2-dihydro-2-oxo-1-pyridyl) glyoxal, bis-N-phthalmidyl oxalate, bis(2,4,5-trichloro-6-carbopentoxyphenyl) oxalate, bis(2,4,5-trichloro-6-carbobutoxyphenyl) oxalate or bis(2,4,6-trichlorophenyl) oxalate, bis(2,4,5-trichloro-6-carbopentoxyphenyl) oxalate, bis(2,4,5-trichloro-6-carbobutoxyphenyl) oxalate and bis(2,4,6-trichlorophenyl) oxalate. The chemiluminescent compound is added as a solution with the plasticizer solvent during the production of the structure, and is present in an amount of about 10 weight percent to about 15 weight percent of the plasticizer solution. The preferred chemiluminescent compound is bis(2,4,5-trichloro-6-carbopentoxyphenyl) oxalate at about a 12% concentration in the plasticizer solvent, preferably dibutylphthalate.

Useful fluorescers are the substituted anthracenes such as 9,10-bisphenylethynylanthracene, 1-chloro-9,10-bisphenylethynylanthracene or 2-chloro-9,10-bis(-paramethoxyphenyl)anthracene and are used at a concentration of about 0.1 weight percent to about 2.0 weight percent, preferably about 0.1 weight percent to about 0.3 weight percent, of the plasticizer solution, and is preferably added therewith during the preparation of the structure.

The structures discussed above are prepared by the novel process of the present invention which comprises forming a uniform slurry of the resin particles in a plasticizer, forming the slurry into a shape and heating the shaped slurry to a temperature of from about 80° C. to about 150° C. for from about 5 to about 50 minutes.

There is also disclosed a preferred process of making the structures wherein a small portion, i.e. from about 0.5 to about 3.0 weight percent of vinyl halide or vinylidene halide polymer particles are first slurried alone in the plasticizer, optionally, containing the fluorescer, and the slurry is heated from about 80° C. to about 150° C. for about 5 minutes to about 20 minutes to obtain a solution to which the remaining vinyl halide or vinylidene halide polymer particles are added in a ratio of about 1.4 parts of solution to about 1.0 part of remaining particles and mixed to form the uniform slurry. The uniform slurry is then formed, preferably into sheets of about 0.1mm to about 10 mm in thickness, preferably about 1.0 mm to about 3.0 mm in thickness, and said sheets are then heated to about 80° C. to about 150° C. for about 5 minutes to about 50 minutes, preferably at about 110°–130° C. for about 10–40 minutes or such that excess fusion does not occur.

The structure may be shaped, for example, by casting, molding, extruding or blow molding the slurry, etc.

DETAILED DESCRIPTION OF THE INVENTION

The desirable characteristics of the chemiluminescent polymer structures of the present invention are the following:

(1) Reasonable strength and flexibility.
(2) Good absorptivity so the chemiluminescent reaction can be initiated by contacting the PVC structure with an activator solution.
(3) Uniform surface appearance.
(4) The structure must not interfere with the chemiluminescence reaction.
(5) Good shelf-life.
(6) The chemiluminescent structure should be translucent.

These properties of the polymer structure are determined in large part by the following factors:

(1) The amount of chemiluminescent solution absorbed into the polymer structure.
(2) The particles size distribution and molecular weight distribution of the polymer particles used.
(3) The rate of heating and the heating time employed during curing.
(4) The amount of polymer that becomes dissolved into the chemiluminescent solution.

The structures of the present invention contain one or more components of the chemiluminescent reaction. The components of the chemiluminescent reaction are incorporated into the structure by any number of means but the preferred method is to dissolve the components of the chemiluminescent reaction in a solvent that swells the vinyl halide or vinylidene halide polymer, and the preferred solvent for this process is dibutylphthalate. The amount of chemiluminescent solution used to swell the polymer varies between about 5 and 90 weight percent; the preferred amount is between about 25 and 80 weight percent, most preferably, about 55–60 weight percent. Any chemiluminescent reaction that is compatible with the matrix material of the sheet may be used; the preferred chemiluminescent reaction being the peroxy-oxalate reaction with the preferred oxalate ester being a carbopentoxyphenyloxalate. Preferred fluorescers for this chemiluminescent reaction are substituted anthracenes. The structure is capable of absorbing an activator solution in order to start the chemiluminescent reaction. It is necessary for the structure to absorb at least one equivalent of the activator solution, but it is preferred that the structure absorb three equivalents of the activator solution. Alternatively, the components of the chemiluminescent reaction can be incorporated into the structure after the structure is formed by absorbing the components into the pores of the structure by merely soaking the structure in a solution of the component.

In order to prepare an absorptive, porous, flexible, strong vinyl halide or vinylidene halide polymer structure with good surface appearance, it has been found that a mixture of two, or preferably three, vinyl halide or vinylidene halide polymer powders selected from fine, medium and large particle size powders, where at least one of the powders is a fine particle powder, is required. Major deviations from the above described process yields structures that are not capable of effectively absorbing activator solution or are physically not acceptable i.e. they are flaky or too fused to be useful.

Whereas there are many uses of the structures of this invention that are obvious to those skilled in the art, in particular said structures are useful for a chemical lighting device wherein the structure is used in a sealed compartment of a transparent plastic package and wherein an activator solution of hydrogen peroxide and, for example, sodium salicylate catalyst are incorporated into a separate sealed compartment thereof. The compartments may be arranged so that the means used to separate the compartments can be broken or removed so that the activator is allowed to flow into the structure to generate chemical light by activating the contained chemiluminescent compound and fluorescer, while still retaining both within the package.

DESCRIPTION OF THE PREFERRED EMBODIMENT

The following examples are set forth for purposes of illustrations only and are not to be construed as limitations on the present invention except as set forth in the appended claims. All parts and percentages are by weight unless otherwise specified.

The following abbreviations are sometimes used to indicate chemical structures, analytical tests and other repeatedly used items.

PVC: Polyvinyl Chloride

Fine Particle PVC: A dusty, white powder of medium viscosity PVC resin having a molecular weight of about 303,000 and an average particle size of 0.20–1.5 microns.

Medium Particle PVC: A white powder of PVC resin produced by mass polymerization having a molecular weight of about 98,000 and an average particle size of 70–75 microns.

Large Particle PVC: A white powder of PVC resin having a molecular weight of about 205,000 and an average particle size of 150 microns.

CPPO: Bis(2,4,5-trichloro-6-carbopentoxyphenyl) oxalate, the oxalate ester used in the chemical light reaction.

BPEA: The fluorescer used in the green chemical light reaction is 9,10-bis(phenylethynylanthracene).

CBPEA: The fluorescer used in the yellow oxalate solution is 1-chloro-9,10-bis(phenylethynylanthracene).

BPEN: The fluorescer used in the blue oxalate solution is 2-chloro-9,10-bis(p-methoxyphenyl) anthracene.

Activator: A dimethylphthalate solution of hydrogen peroxide and sodium salicylate.

Spotmeter: Instrument used to measure the light output intensity of a chemical light reaction over time. This instrument is made by Kollmorgen Corporation, Model UBD1/4.

TLOP: Total light output.

Glow Time: The time required to emit 90% of the total light generated by the structure.

TOTAL LIGHT OUTPUT MEASUREMENTS

The following method is the standard test used herein for measuring total light outputs of samples. The sample is prepared and cut into 1"×2½" pieces. These test pieces are placed inside 1⅜"×3¾", 1.5 mil thick, polypropylene bags. The openings of these bags are then heat sealed just above the contained sample, leaving a tab of polypropylene at what was the open end of the polypropylene bag for hanging it in front of the spotmeter. The test pieces are activated by injecting the activator solution into the polypropylene bags with a syringe. The amount of activator used depends on the thickness of the sample. Usually 1.5 ml. of activator is required for a 3–4 mm thick sample. The bags are hung vertically during testing and the syringe needle is inserted into the bag near the top.

The spotmeter is focused on the center of the bag at a distance of three inches to one foot. Up to eight samples can be tested simultaneously by placing them on an eight position carousel holder. The carousel and spotmeter are under computer control allowing for both data acquisition and control of the sample positioned in front of the spotmeter.

The samples are activated 10 sec. apart and the data acquisition started 2 min. after the first sample is activated. The computer is set to change samples every 10 sec. The run duration and maximum spotmeter scale depend on the concentration of catalyst in the activator solution. The usual settings for activator are 6 hr. duration and 0–199 ft. 1 m (a spotmeter setting of 101 for green and yellow test samples, and a spotmeter setting of 100 for blue test samples).

The surface appearance while glowing, as well as, the total light output, the glow time, the mechanical strength, and the absorptivity must be considered in the optimization of a chemiluminescent product. Variations in catalyst concentration in the activator solution cause the glow time of activated structures to vary between 30 min. and 6 hr. The best light outputs are obtained at glow times of about 4 hr. Activation of the structures requires about 0.2–0.25 part of activator solution per part of structure. The brightness of the structure depends on its thickness. Without a reflective support, the brightness increases with increasing thickness. The brightness of a thick structure can be duplicated with a thinner structure that has a reflective backing. A good working thickness is about 3–4 mm with a reflective backing facing the front of the structure.

EXAMPLE A

Oxalate Solution Preparation

Dibutylphthalate (864 parts) is added to a suitable dry vessel that has been purged with nitrogen and fitted with an overhead stirrer, thermocouple thermometer, nitrogen inlet adapter and heating mantle. This solvent charge is heated to 50° C. Fluorescer is added and the mixture is stirred for 30 min. while the temperature is maintained at 50° C. CPPO (133 parts) is added and the solution is stirred at 50° C. for an additional 2 hours. The mixture is allowed to cool to room temperature and filtered under a nitrogen atmosphere through a medium frit sintered glass funnel.

The oxalate formulations for application in the structures are shown in the table below.

| Color | Formulations |
| --- | --- |
| Blue | 12 wt % CPPO. 0.2 wt % BPEN |
| Green | 12 wt % CPPO. 0.15 wt % BPEA |
| Yellow | 12 wt % CPPO. 0.25 wt % CBPEA |

The amounts of the fluorescers and CPPO are adjusted to take into account the relative purities of the materials so that the active components of the oxalate solution will be present in the amounts shown in the table above.

EXAMPLE 1

Fine particle size PVC is sifted through a fine wire screen to remove large particles. The fine particle size PVC (10 parts) is then thoroughly mixed with a small amount of the oxalate solution of Example A to form a thick paste. The thick paste is slowly added to the remainder of 268 parts of the oxalate solution with vigorous agitation. A nitrogen atmosphere is maintained over the slurry so as to protect it from atmospheric moisture and the slurry is heated rapidly to 100°–110° C. in about 5–10 minutes and maintained at this temperature for 10–15 minutes. The PVC dissolves and the resultant solution becomes more viscous. The solution is cooled to 50°–60° C. and 270 parts of oxalate are added with stirring. 288 Parts of medium particle size PVC and 86.1 parts of large particle size PVC are added through a powder funnel. The slurry becomes very thick and is stirred manually with a spatula into a smooth mixture.

90 Parts of the mixture are poured into a 5×8 inch glass-bottomed form, heated in an oven at 110°–120° C. for 10 minutes, removed from the oven and allowed to cool to room temperature. The cooled structure is easily pealed from the form and cut into samples for testing. The structure is about 4 mm thick. Addition of the activator solution of Example B, below, results in the production of chemiluminescent light.

EXAMPLE B

Activator Solution

An activator solution is prepared by stirring together 81.4 parts of dimethyl phthalate, 13.3 parts of t-butyl alcohol, 5.29 parts of 90% aqueous hydrogen peroxide and 0.043 part of sodium salicylate until complete solution occurs.

EXAMPLE 2

Structures are prepared by slurrying together 14 parts of oxalate solution and varying amounts of fluorescer with 10 parts of a PVC particle mixture of 2.0 parts of large particle PVC, 7.5 parts of medium particle PVC and 0.5 part of fine particle PVC. Each slurry is baked in an oven at 120° C. for 10 minutes, and the result structure is cooled to room temperature and cut into 1×3 inch strips which are then sealed in polypropylene bags. The structures are activated by injecting 1.6 parts of activator solution of Example B into the bag and mixing. The activated structures in the bags are placed in front a spotmeter at a distance of 3 inches. Data is collected beginning two minutes after activation. The results are set forth in Table I, below.

TABLE I

| COLOR  | FLUORESCER (WT %) | TLOP (FT-L-HR) |
| --- | --- | --- |
| YELLOW | 0.25 | 71.1 |
| YELLOW | 0.30 | 67.9 |
| YELLOW | 0.35 | 73.5 |
| GREEN  | 0.15 | 47.9 |
| GREEN  | 0.20 | 46.3 |
| BLUE   | 0.07 | 7.09 |
| BLUE   | 0.11 | 8.87 |
| BLUE   | 0.14 | 9.40 |
| BLUE   | 0.20 | 10.08 |
| BLUE   | 0.25 | 13.51 |

EXAMPLE 3

Structures are prepared as described in Example 2. The oxalate solutions used in this example contain varying amounts of CPPO. The fluorescer concentrations are 0.1 weight percent BPEN for the blue oxalate, 0.11 weight percent BPEA for the green oxalate, and 0.26 weight percent CBPEA for the yellow oxalate. The structures are activated and the TLOP measured, as described above. The results are shown in Table II, below.

TABLE II

| COLOR  | CPPO (WT %) | TLOP (FT-L-HR) |
| --- | --- | --- |
| YELLOW | 8     | 39.6 |
| YELLOW | 11    | 46.2 |
| YELLOW | 15*   | 71.1 |
| YELLOW | 17    | 66.8 |
| GREEN  | 4     | 8.98 |
| GREEN  | 7.8   | 15.2 |
| GREEN  | 12    | 27.4 |
| GREEN  | 15*   | 26.2 |
| BLUE   | 3.7   | 2.35 |
| BLUE   | 7.7   | 6.47 |
| BLUE   | 11.7  | 8.87 |
| BLUE   | 14.2* | 7.80 |

*The CPPO slowly precipitates out of this oxalate solution.

EXAMPLE 4

TLOP vs Oxalate: PVC Ratio

Structures are prepared by slurrying together varying amounts of yellow fluorescer oxalate solution with PVC powder (10 parts) directly in a suitable vessel. The PVC powder mixture is composed of large particle size PVC (2.0 parts), medium particle size (7.5 parts) and fine particle size PVC (0.5 part). These slurries are baked in an oven at 120° C. for 10 min. The baked PVC is cooled and cut into 1×3 inch strips which then are sealed in polypropylene bags. The strips are activated by injecting 1.6 parts of activator into the polypropylene bag. The bags are placed in front of the spotmeter at a distance of 3 inches. Data collection from the spotmeter is begun 2 min. after activation. The results of this study are shown in Table III, below.

The light output increases and then levels off at a ratio of about 1.4:1. The structure is strong and does not crumble during or after the baking stage of the preparation. When lower oxalate/PVC ratios are employed, the resultant structures are flaky and cannot be handled. Higher oxalate/PVC ratios result in structures that are over plasticized and not very absorptive of the activator solution.

TABLE III

| ACTIVATOR(PARTS) | OXALATE/PVC RATIO (WT:WT) | TLOP (FT-L-HR) |
| --- | --- | --- |
| 9  | 0.9:1 | 28.2 |
| 10 | 1.0:0 | 29.2 |
| 11 | 1.1:1 | 31.1 |
| 12 | 1.2:1 | 30.8 |
| 13 | 1.3:1 | 34.8 |
| 14 | 1.4:1 | 40.7 |
| 15 | 1.5:1 | 38.6 |
| 17 | 1.7:1 | 38.9 |

EXAMPLE 5

TLOP vs STL Thickness

Structures are prepared from yellow fluorescer oxalate solutions as described in Example 1. The thickness of the structures is controlled by using molds of different area and varying the amount of slurry used. The molds, weights of slurry used, and the resulting thickness of the structure after baking are shown in Table IV.

TABLE IV

| SLURRY WEIGHT (PARTS) | MOLD | THICKNESS (MM) |
| --- | --- | --- |
| 10   | 90 mm dish | 1.3 |
| 45   | 5 × 8 inch | 1.9 |
| 15   | 90 mm dish | 2.3 |
| 67.5 | 5 × 8 inch | 2.9 |
| 20   | 90 mm dish | 3.4 |
| 90   | 5 × 8 inch | 3.7 |
| 25   | 90 mm dish | 4.2 |
| 35   | 90 mm dish | 5.1 |
| 40   | 90 mm dish | 7.0 |

The structures are cut into 1×2½ inch pieces, activated with the activator solution of Example B, and their TLOP measured. The amount of activator used is in proportion to the thickness of the structure. The results are shown in Table V.

TABLE V

| STL PAD THICKNESS (MM) | BRIGHTNESS (FT-L) | TLOP (FT-L-HR) |
| --- | --- | --- |
| 1.9 | 57.5 | 36.0 |
| 2.9 | 68.1 | 41.4 |
| 3.4 | 59.0 | 44.4 |
| 3.7 | —    | 56.0 |
| 4.2 | 62.6 | 51.9 |
| 5.1 | 69.6 | 66.6 |
| 7.0 | 93.3 | 78.8 |

The TLOP of the structures is also measured for those of the same thickness; with and without reflective aluminum foil backing. The results are shown in Table VI.

TABLE VI

| THICKNESS (MM) | WITH OR WITHOUT FOIL BACKING | BRIGHTNESS (FT-L) | TLOP (FT-L-HR) |
| --- | --- | --- | --- |
| 1.9 | with | 70.2 | 46.1 |
| 1.9 | without | 57.5 | 36.0 |
| 2.9 | with | 96.7 | 61.6 |
| 2.9 | without | 68.1 | 41.4 |
| 3.4 | with | 62.1 | 57.1 |
| 3.4 | without | 59.0 | 44.4 |
| 3.7 | with | — | 63.7 |
| 3.7 | without | — | 56.0 |

EXAMPLE 6

Catalyst Concentration Studies

A series of tests is performed on the yellow, green, and blue structures to determine the effect of catalyst concentration in the activator on the TLOP and glow time. The glow time is taken to be the time period from activation until 90% of the possible light output has been given off. The structures are prepared in the same way as those described in Example 1. The 1×2 inch samples are sealed in polypropylene bats and activated by injecting 1.5 ml of the activator into the bag. The catalyst (sodium salicylate-NaSal) concentration in the activator is varied. The light output is measured with the spotmeter at a distance of one foot from the samples. Table VII sets forth the results.

TABLE VII

| Parts NaSal | TLOP (FT-L-HR) | GLOW TIME |
| --- | --- | --- |
| YELLOW STL | | |
| 0.009 | 57.3 | 436 |
| 0.019 | 64.6 | 267 |
| 0.029 | 63.1 | 158 |
| 0.043 | 57.3 | 95 |
| 0.050 | 57.3 | 85 |
| 0.062 | 48.1 | 65 |
| 0.071 | 41.4 | 57 |
| 0.082 | 40.1 | 44 |
| 0.087 | 39.6 | 39 |
| GREEN STL | | |
| 0.009 | 43.0 | 330 |
| 0.019 | 47.4 | 217 |
| 0.029 | 43.3 | 119 |
| 0.043 | 42.3 | 80 |
| 0.050 | 41.6 | 90 |
| 0.062 | 39.4 | 74 |
| 0.071 | 38.9 | 62 |
| 0.082 | 35.5 | 44 |
| 0.087 | 34.4 | 42 |
| BLUE STL | | |
| 0.009 | 8.6 | 412 |
| 0.019 | 10.0 | 324 |
| 0.029 | 9.4 | 209 |
| 0.043 | 9.3 | 111 |
| 0.050 | 9.1 | 108 |
| 0.062 | 8.2 | 79 |
| 0.071 | 9.5 | 52 |
| 0.082 | 8.6 | 38 |
| 0.087 | 7.6 | 36 |

EXAMPLE 7

Activator Absorption Studies

Three different oxalate-PVC mixtures are prepared that vary in the amount of fine particle PVC used in the PVC part of the formulation. Yellow fluorescer-oxalate solution is used in a ratio of 1.4:1 (wt/wt) with the PVC mixtures shown in the following table.

| FORMULATION | PVC Particle Size | | |
| --- | --- | --- | --- |
| | FINE | MEDIUM | LARGE |
| No. 1 | 2.6 wt % | 75 wt % | 22.4 wt % |
| No. 2 | 3.8 wt % | 75 wt % | 21.2 wt % |
| No. 3 | 5.7 wt % | 75 wt % | 19.3 wt % |

The fine particle PVC is dissolved in the oxalate solution at 100° C. The resultant solution is cooled to room temperature and the remaining medium and large PVC is added. Portions of 24 parts of these slurries are poured into molds and baked in an oven at 120° C. for 10 min. The resulting structures are cooled and cut into 1 inch squares. The dry weights of these squares are recorded. These samples are placed in a vessel containing activator solution at room temperature. The weight gain of these samples is taken at 1,2,3,5, and 10 min. intervals. The results are shown on Table VIII titled Activator Absorption where parts of activator absorbed per part of sample is measured against time. The standard commercial chemical lightstick contains 2.8 parts of activator and 7.8 parts of oxalate solution. On a weight of active chemical basis, this corresponds to the absorption of 0.21 part of activator per part of sample. It can be seen from Table VIII that the samples obtained from PVC formulation NO. 1 absorb the required amount of activator in about 2 min. The other formulations, No. 2 and No. 3, do not absorb the needed amount of activator.

TABLE VIII

| ACTIVATOR ABSORPTION | | | | | |
| --- | --- | --- | --- | --- | --- |
| No. 1 2.6% Fine PVC | | No. 2 3.8% Fine PVC | | No. 3 5.7% Fine PVC | |
| Time Min. | Wt. Gain | Time Min. | Wt. Gain | Time Min. | Wt. Gain |
| 1 | 0.13 | 1 | 0.007 | 1 | 0.025 |
| 2 | 0.21 | 2 | 0.09 | 2 | 0.025 |
| 3 | 0.24 | 3 | 0.10 | 3 | 0.027 |
| 5 | 0.25 | 5 | 0.11 | 5 | 0.030 |

EXAMPLE 8

Environmental Moisture Exposure Studies

Structures are made by mixing large (13.75 parts), medium (29.7 parts), and fine (2.75 parts) particle PVC, and yellow fluorescer oxalate solution (63.8 parts) in a blender. The resulting slurry is poured into a rectangular form and baked in an oven at 120° C. for 10 min. The structure is allowed to cool and cut into 1×3 inch strips. Approximately 50 of these test strips are made by repetition of this procedure. These samples are suspended from a "line" in the dark. Also in the dark are approximately 50 open vials containing samples of the same yellow fluorescer oxalate solution used in the preparation of the structures. The temperature and humidity are monitored. The relative humidity averages around 55% and the temperature varies between 20°-25° C. The TLOP of the structures and lightsticks made from the oxalate stored in the open vials, are taken about once a week. These light output experiments are conducted by taking a random sample of three of the structures and sealing them in polyethylene bags. These bagged samples are placed three inches in front of the spotmeter and activated by injecting 1.6 ml. of high activator into the bag. Three lightsticks are also prepared from the oxalate solution that was stored in the open vials. These lightsticks are prepared with ampoules of the same activator solution that is used to activate the bagged samples. The amount of oxalate and activator used in these lightsticks is 7.8 parts and 2.8 parts, respectively. The lightsticks are also placed three inches in front of the spotmeter and data collection is started two minutes after activation. The average TLOP of the three bagged samples and the three lightsticks at different exposure times are shown in Table IX, below.

TABLE IX

| EXPOSURE (WEEKS) | TLOP LIGHTSTICK (FT-L-HR) | TLOP STRUCTURE (FT-L-HR) |
| --- | --- | --- |
| 0 | 111.3 | 43.2 |
| 1 | 100.1 | 44.3 |
| 2 | 92.7 | 41.7 |
| 3 | 71.6 | 40.1 |
| 4 | 77.4 | 41.3 |
| 5 | 70.1 | 37.4 |
| 6 | 69.2 | 38.0 |
| 8 | 54.9 | 34.9 |
| 10 | 14.4 | — |
| 12 | 9.7 | 18.7 |

It is apparent that the light output of the PVC structure samples decays more slowly than the light output of the exposed oxalate solution. It is necessary, however, to protect the structures with a moisture barrier during storage in order to maintain their shelf life.

EXAMPLE 9

Fluorescent Light Exposure Studies

Yellow light emitting structures are prepared from oxalate containing 12 parts of CPPO and 0.25 part of CBPEA. Green light emitting structures are prepared from oxalate containing 12 parts of CPPO and 0.15 part of BPEA and blue light emitting structures are prepared from oxalate containing 12 part of CPPO and 0.2 part of BPEN. The structures used in these tests are cut into 1×2 inch strips and sealed in polypropylene bags. The bagged samples are placed under a fluorescent light fixture fitted with two F40/CW, cool white, 40 watt, fluorescent lamps mounted 8¼ inches above the samples. The samples are turned over every morning and evening. The average TLOP of three samples is taken at successively longer time intervals. The samples are placed one foot in front of the spotmeter and activated by injecting 1.5 parts of activator into the bag. Table X sets forth the results.

TABLE X

| EXPOSURE TIME (HR) | TLOP (FT-L-HR) |
| --- | --- |
| YELLOW | |
| 0 | 68.0 |
| 6 | 47.6 |
| 22 | 40.3 |
| 47 | 33.4 |
| 77 | 27.9 |
| 144 | 25.4 |
| GREEN | |
| 0 | 44.7 |
| 6 | 39.8 |
| 24 | 36.7 |
| 48 | 32.9 |
| 72 | 30.1 |
| 168 | 26.4 |
| BLUE | |
| 0 | 8.19 |
| 6 | 8.42 |
| 24 | 7.34 |

TABLE X-continued

| EXPOSURE TIME (HR) | TLOP (FT-L-HR) |
| --- | --- |
| 48 | 7.29 |

EXAMPLE 10 (COMPARATIVE)

Absorbance of Monoparticle Structures

This example illustrates the different absorptivities of structures prepared from PVC powders with different particle sizes and different molecular weights. The structures are prepared by slurrying together 10 parts of a dibutylphthalate solution of oxalate ester and flourescer as in Example 1 with 10 parts of the PVC powder to be tested. The resulting slurries are placed in molds and baked in an oven at 120° C. for 10 min. Square pieces are cut from the cooled structures. The initial weight of the pieces is recorded. The pieces are soaked in activator solution as in from Example 1 until their weight gain is constant. The particle size, average molecular weight, parts of activator absorbed per part of structure and the physical appearance of the structure are shown in Table XI.

| PARTICLE SIZE | AVERAGE MOLECULAR WEIGHT | PARTS OF ACTIVATOR PER PART OF STRUCTURE | APPEARANCE OF STRUCTURES |
| --- | --- | --- | --- |
| 0.2–1.5 microns (A) | 303,000 | 0.05 | tough, highly plasticized |
| 70–75 microns (B) | 98,000 | 0.28 | smooth surface, friable |
| 120 microns (C) | 104,000 | 0.45 | rough surface, fragile |
| 150 microns (D) | 205,000 | 0.62 | bumpy surface, very fragile |

Larger particle size gives structures that are more porous and absorptive. The highly absorptive structures are crumbly and friable. The less absorptive structures are very tough and flexible. Thus, it is clear that structures of the desired properties do not result when using only single PVC particles regardless of their size or molecular weight as shown in U.S. Pat. No. 3,816,325.

EXAMPLE 1

The following example illustrates the use of combinations of different PVC powders to prepare chemiluminescent structures. In some of these formulations, a portion of the PVC powder is dissolved in the chemiluminescent solution prior to adding the rest of the PVC powder and curing. Four different PVC powders are used as referred to as A, B, C, and D in Example 10.

Five different formulations are prepared. All of these formulations use the chemiluminescent solution of Example 1. Formulation No. 1 is prepared by dissolving 1.6 parts of PVC powder A in 87.5 parts of the chemiluminescent solution at 100° C. for 15 min. To this cooled solution are added 60.9 parts of PVC powder B. Formulation No. 2 is a slurry of 46.9 of PVC powder B and 15.6 parts of PVC powder D in 87.5 parts of the chemiluminescent solution. Formulation No. 3 is prepared by dissolving 1.6 parts of PVC powder A in 87.5 parts of the chemiluminescent solution at 100° C. for 15 min. To this cooled solution are added 46.9 parts of PVC powder B and 14 parts of PVC powder C. Formulation No. 4 is prepared by dissolving 20.3 parts of PVC powder A in 1096 parts of the chemiluminescent solution at 100° C. for 15 min. To this cooled solution are added 586 parts of PVC powder B and 175 parts of PVC powder D. Formulation No. 5 is prepared by dissolving 1.6 parts of PVC powder A in 87.5 parts of the chemiluminescent solution at 100° C. for 15 min. To this cooled solution are added 60.9 parts of PVC powder D. A structure is made from each of these formulations by pouring 84.5 parts of slurry into a square mold and curing in an oven at 120° C. for 10 min. The absorbency of each of the resultant structures is measured by soaking a one inch square pice in activator solution until it no longer gains weight. The ratio of the weight gain to the initial weight of the test piece is shown in Table XII, below, along with a description of the physical appearance of the structure.

TABLE XII

| FORMULATION NO. | PARTS OF ACTIVATOR PER PART OF STRUCTURE | APPEARANCE OF SHEET |
| --- | --- | --- |
| 1 | 0.22 | smooth surface, good strength |
| 2C | 0.25 | slurry settles quickly, slightly flaky surface |
| 3 | 0.33 | smooth surface, good strength, can be folded without breaking, slightly stretchy |
| 4 | 0.35 | appearance similar to sheet from formulation No. 3 |
| 5C | 0.68 | poor strength, very flaky suface |

C = Comparative

EXAMPLE 12 (Comparative).

The following example further illustrates the utility in using a variety of different PVC resins as the dissolved PVC in the formulation. Three different formulations are prepared. All of these formulations use the dubutylphthalate chemiluminescent solution plasticizer of Example 1. Formulation No. 6 is prepared by dispersing 1.6 parts of PVC powder D in 87.5 parts of the chemiluminescent solution. The dispersed PVC powder is dissolved in the chemiluminescent solution by heating to 100° C. for 15 min. After cooling the solution, there are added 46.9 parts of PVC powder B and 14 parts of PVC powder D. Formulation No. 7 is prepared by dissolving 1.6 parts of PVC powder C in 87.5 parts of the chemiluminescent solution, as described above. A slurry of this solution is made by adding 46.9 parts of PVC powder B and 14 parts of PVC powder D. Formulation No. 8 is prepared as described above by dissolving 1.6 parts of PVC powder B in 87.5 parts of the chemiluminescent solution. Again a slurry is made from this solution by adding 46.9 parts of PVC powder B and 14 parts of PVC powder D. A sheet of chemiluminescent material is made from each of these formulations by pouring 84.5 parts of the slurry into a square tray and curing in an oven at 120° C. for 10 min. The absorbency of each of these sheets is measured by soaking a one inch square piece of the sheet in the activator solution until it no longer gains weight. The ratio of the weight gain to the initial weight of the test piece is shown Table XIII, below, plus description of the physical appearance of the structure.

TABLE XIII

| FORMULATION NO. | PARTS OF ACTIVATOR PER PART OF STRUCTURE | APPEARANCE OF STRUCTURE |
| --- | --- | --- |
| 6C | 0.33 | textured (orange peel) surface, strong, stretchy, can be folded double, flaky when cut |
| 7C | 0.37 | smooth surface, breaks when folded double, strong, stretchy, flaky around edges |
| 8C | 0.33 | same as formulation No. 7 |

C = Comparative

Strips (1×3 inch) are cut from the above samples. These strips are sealed in polypropylene bags. The chemiluminescent reaction is started by injecting 1.6 parts of activator solution into the polypropylene bag. The light intensity from these strips is measured with a photometer focused at the center of the strip. The light intensity is integrated over time to give the total light output (TLOP) in units of foot lambert hours. These light outputs are given for each formulation below.

| FORMULATION NO. | TLOP (FT-L-HR) |
| --- | --- |
| 6 | 31.6663 |
| 7 | 30.3903 |
| 8 | 36.4072 |

EXAMPLE 13

The following example illustrates the results of using mixtures of different types of PVC powders in preparing sheets of chemiluminescent materials. In this example, the PVC powders are simply stirred into a slurry with the chemiluminescent solution. None of the PVC powder is deliberately dissolved into the chemiluminescent solution prior to making the slurry. A variety of different PVC powder mixtures are made from PVC powders A, B, and D of Example 10. These different PVC powders mixtures are slurried with varying amounts of a chemiluminescent solution and baked in an oven at 120° C. for 10 min. The following results are observed.

1) PVC powder A behaves as a binder for the structure. Less than 0.5 weight percent of PVC powder A gives flaky, crumbly structures. Over 15 weight percent of PVC powder A gives very tough structures which are not absorbant. The preferred range is about 0.5 to about 3.0, weight percent.

2) PVC powder B acts as a filler material. It is a moderate binder when not initially dissolved into the chemiluminescent solution, and it is a moderate absorber.

3) PVC powder D is a very good absorbent, but a very poor binder when not initially dissolved into the chemiluminescent solution.

EXAMPLE 14

Curing Time and Temperature

This example illustrates the effects of different curing times and temperatures on the absorptivity and TLOP of the chemiluminescent structure. All are prepared from Formulation No. 4 of Example 11. Table XIV, below, show the curing times, curing temperatures, and physical appearance of the sheet.

TABLE XIV

| TEMP | TIME | APPEARANCE OF SHEET |
| --- | --- | --- |
| 90° C. | 10 min | smooth surface, reasonable strength |
| 90° C. | 15 min | smooth surface, good strength |
| 120° C. | 30 min | smooth surface, strong |
| 150° C. | 5 min | very strong, tough, flexible, slightly over plasticized |
| 150° C. | 10 min | slightly translucent, very strong, tough, over plasticized* |
| 150° C. | 20 min | translucent, very strong and strong and tough, highly plasticized* |

* = Comparative

The absorptivities and light outputs are measured for each of these structures by the methods described above. The results of each of these measurements are shown in Table XV, below.

TABLE XV

| TEMP (°C.) | TIME (MIN) | PARTS OF ACTIVATOR PER PART OF STRUCTURES | TLOP (FT-L-HR) |
| --- | --- | --- | --- |
| 90 | 10 | 0.27 | 36.3930 |
| 90 | 15 | 0.30 | 34.5938 |
| 90 | 30 | 0.32 | 34.8413 |
| 120 | 10 | 0.35 | 37.8190 |
| 150 | 5 | 0.17 | 22.8411 |
| 150 | 10 | 0.02 | 6.4400 |
| 150 | 20 | 0.02 | 1.6309 |

EXAMPLES 15–24

The procedure of Example 1, unless otherwise specified, is followed except that different polymer formulations are used. The polymers are specified below. In each instance, similar results are observed.

15. Polyvinylidene chloride.
16. Copolymer of vinyl chloride and ethylene (80/20).
17. Copolymer of vinylidene chloride and vinyl fluoride (50/50) (large particles only).
18. Polyvinyl fluoride (fine particles only). (Example 2 procedure followed)
19. Copolymer of vinylidene chloride and propylene (90/10). (Example 4 procedure followed).
20. Copolymer of vinyl chloride and vinyl fluoride (95/5) (medium particles only).
21. Copolymer of vinyl chloride and vinylidene chloride (75/25).
22. Mixture of polyvinylchloride and polyvinylidene chloride (50/50).
23. Terpolymer of vinyl chloride, vinyl fluoride and vinylene chloride (85/10/5).
24. Mixture of polyvinylchloride and polyethylene (75/25).

We claim:

1. A method of producing a porous, flexible structure, comprising: (1) adding a first component and a second component to a solvent solution of a chemiluminescent compound and, optionally, a fluorescer, to form a uniform slurry, (2) shaping said slurry, and (3) heating said shaped slurry to a temperature of from about 80° C. to about 150° C. for from about 5 minutes to about 50 minutes wherein the first component comprises a non-particulate phase comprising a vinyl halide or vinylidene halide polymer having a molecular weight of about 100,000 to about 500,000 which constitutes about 0.5 to about 15.0 weight percent of total polymer, and the second component comprises an agglomerated particle phase comprising either (1) about 85.0 to about 99.5 weight percent of total polymer of vinyl halide or vinylidene halide polymer particles having a diameter of from about 25 to about 125 microns and a molecular weight of from about 50,000 to about 120,000, or mixtures of said particles, or (2) about 45 to about 98.5 weight percent of total polymer of vinyl halide or vinylidene halide polymer particles having a diameter of from about 25 to about 125 microns and a molecular weight of from about 50,000 to about 120,000 or mixtures of said particles, and about 1 to about 40 weight percent of total polymer of vinyl halide or vinylidene halide polymer particles having a diameter of from about 130 to about 225 microns and a molecular weight of from about 100,000 to about 225,000.

2. A method according to claim 1 wherein the step of adding the first and second components includes first dissolving from about 0.5 to about 3.0 weight percent of said non-particulate phase or agglomerated particle phase in said solvent solution to form a solution and then adding the remainder of said non-particulate phase and agglomerated particle phase to the thus formed solution to form said uniform slurry.

3. A method according to claim 1 wherein the shaping step includes shaping the slurry by extrusion.

4. A method according to claim 1 wherein the shaping step includes shaping the slurry by blow molding.

5. A method according to claim 1 wherein the solvent solution is dispersed throughout both phases and the solvent solution comprises a solvent which is selected from dialkyl esters of phthalic acid, ethylene glycol ethers, citric acid esters or alkyl benzoates and is present in amounts of from about 0.5 parts to about 3.0 parts per part of resin.

6. A method according to claim 1 wherein the solvent solution is dispersed throughout both phases and the solvent solution comprises a solvent which is dibutyl phthalate.

7. A method according to claim 2 wherein the remainder of said non-particulate phase and agglomerated phase are added in a ratio of from about 1.0 part of the remainder to about 1.4 parts of solution.

8. A method according to claim 1 wherein the solvent solution is dispersed throughout both phases and the chemiluminescent compound is selected from 3-aminophthalhydrazide; 2,4,5-triphenylimidazole; 10,10'-dialkyl-9,9'biacridinium salts; 9-chlorocarbonyl-10-methyladridinium chloride, bis(1,2-dihydro-2-oxo-1-pyridyl) glyoxal and bis(substituted-phenyl)oxalates.

9. A method according to claim 1 wherein the chemiluminescent compound is bis(2,4,5-trichloro-6-carbopentoxyphenyl) oxalate.

10. A method according to claim 1 wherein said agglomerated particle phase constitutes polyvinylchloride resin particles having a diameter of from about 25 to about 125 microns and a molecular weight of from about 50,000 to about 120,000, or mixtures of said particles.

11. A method according to claim 1 wherein said agglomerated particle phase constitutes polyvinylchloride resin particles having a diameter of from about 25 to about 125 microns and a molecular weight of from about 50,000 to about 120,000, or mixtures of said particles and polyvinylchloride resin particles having a diameter of from about 130 to about 225 microns and molecular weight of from about 100,000 to about 225,000.

* * * * *

UNITED STATES PATENT AND TRADEMARK OFFICE
CERTIFICATE OF CORRECTION

PATENT NO. : 5,348,690
DATED : September 20, 1994
INVENTOR(S) : Cohen et al.

It is certified that error appears in the above-identified patent and that said Letters Patent is hereby corrected as shown below:

```
In Column 16, Line 62 in Claim 8:
    replace "methyladridinium  chloride, bis(1,2-dihydro-2-oxo-
    1-" with --methylacridinium chloride, bis(1,2-dihydro-2-oxo-1- --
```

Signed and Sealed this

Seventh Day of March, 1995

Attest:

BRUCE LEHMAN

*Attesting Officer*  *Commissioner of Patents and Trademarks*